United States Patent [19]

Karydas

[11] Patent Number: 4,823,873
[45] Date of Patent: Apr. 25, 1989

[54] STEAM MEDIATED FLUOROCHEMICALLY ENHANCED OIL RECOVERY

[75] Inventor: Athanasios Karydas, Brooklyn, N.Y.

[73] Assignee: Ciba-Geigy Corporation, Ardsley, N.Y.

[21] Appl. No.: 129,518

[22] Filed: Dec. 7, 1987

[51] Int. Cl.$^4$ .................. E21B 43/22; E21B 43/24
[52] U.S. Cl. .................. 166/272; 166/303; 252/8.554
[58] Field of Search ............ 166/261, 272, 288, 303; 252/8.554

[56] References Cited

U.S. PATENT DOCUMENTS

| | | | |
|---|---|---|---|
| 3,156,299 | 11/1964 | Trantham | 166/261 X |
| 3,483,923 | 12/1969 | Darley | 166/272 X |
| 3,575,899 | 4/1971 | Pryor et al. | 524/47 |
| 4,018,689 | 4/1977 | Thompson | 252/8.551 |
| 4,085,800 | 4/1978 | Engle et al. | 166/272 X |
| 4,408,043 | 10/1983 | Seale et al. | 252/8.554 X |
| 4,425,242 | 1/1984 | Penny et al. | 252/8.551 |
| 4,432,882 | 2/1984 | Raynolds et al. | 166/308 X |
| 4,440,653 | 4/1984 | Briscoe et al. | 252/8.554 |
| 4,460,791 | 7/1984 | Cooke | 568/45 |
| 4,536,304 | 8/1985 | Borchardt | 166/305.1 X |
| 4,557,837 | 12/1985 | Clark, III et al. | 166/307 X |
| 4,565,639 | 1/1986 | Penny et al. | 166/305.1 X |
| 4,594,200 | 6/1986 | Penny et al. | 260/509 X |

FOREIGN PATENT DOCUMENTS 658725 3/1963 Canada.

*Primary Examiner*—George A. Suchfield
*Attorney, Agent, or Firm*—Luther A. R. Hall

[57] ABSTRACT

A steam mediated oil recovery process comprising contacting an oil deposit with a fluorochemical of the formula $$[(R_f)_n(R')_p]_m Z \qquad (I)$$

wherein each $R_f$ is independently a perfluoroaliphatic or omega-hydroperfluoroaliphatic group each of which is optionally interrupted by carbonyl, carboxy, carbonylamino, oxygen, sulfur, sulfinyl, or sulfonyl; n is 1-3 and p is 0 of 1 provided that when p is 0, n is 1; m is 1-5000; each R' is independently an organic linking group between $R_f$ and Z having a valency of n+1; and Z is a hydrocarbyl containing residue of valency m.

17 Claims, No Drawings

STEAM MEDIATED FLUOROCHEMICALLY ENHANCED OIL RECOVERY

BACKGROUND OF THE INVENTION

Viscosity frequently limits the rate crude oil can be produced from a well. For example, in wells that are pumped by a sucker rod string, viscous drag by the crude oil on the string slows its free fall by gravity on the downstroke. On the upstroke, this drag also slows the string, decreases oil flow through the production tubing, and increases the power required to raise oil and rod string. In some instances where the oil is highly viscous, such as the Boscan field in Venezuela, the strength of the sucker rods limits the depth at which the pump can be operated. Alternatively, hydraulic pumps can be placed at the bottom of the well, but they must still overcome the high viscous drag that requires high power oil pressures and high pump horsepower.

The downhole pump usually provides the pressure required to pump the produced oil from the wellhead to surface gathering tanks. Where viscosity is high, this may require the use of extra strength wellhead equipment (packings, gaskets, heavy walled pipes and the like) to withstand the pressures required to move such viscous oil from wellhead to storage tank.

It has been proposed heretofore to reduce the viscosity of heavy crude oils prior to pumping by introducing low viscosity crude oils, white oil, kerosene or the like into the well bore to dilute or thin the produced crude. In rod pumped wells, it is common to surround the sucker rod string with an extra tubing. Low viscosity oil is pumped down this tubing so that the string is surrounded by lower viscosity oil. This added light oil then mixes with the viscous crude near the traveling valve of the pump to lighten and thin the column of crude oil being pumped from the well through the annulus formed by the inner and the production tubings of the well. Alternatively, low viscosity oil can be pumped down hollow sucker rods and the diluted crude oil produced through the annulus between the hollow rod string and the tubing.

The resulting produced crude has reduced viscosity and is more economically transported; however, these low viscosity diluents are expensive and not always available and have to be reclaimed from the diluted crude.

Another method of reducing the viscosity of the produced heavy crude is by thermal methods, that is, producing them at elevated temperatures. Thermal recovery pertains to oil recovery processes in which heat plays a principal role. The most widely used thermal techniques are hot fluids such as steam, water, or gas and cyclic operations such as steam soaking. Because of the strong temperature dependence of oil viscosity, these thermal methods find greatest applicatiomn in the recovery of extremely viscous, low API gravity crudes, for which the usual displacement method such as waterflooding are unfruitful.

Cyclic steam injection (also called huff and puff steam stimulation) is the most commonly applied thermal recovery process. Steam is injected directed into the reservoir through the production wells to heat the surrounding area. The condensation and cooling of the steam heats the reservoir rock and oil, reducing the oil viscosity and thus increasing production rates. After two or three weeks, the steam injection is stopped and the heated oil is produced from these same wells. After the hot oil production has ended, a new cycle may be initiated. The time period of the cycles is on the order of six to twelve weeks or longer. These reservoirs are usually shallow and producing wells are drilled on very close spacing because the heat does not penetrate far from the wells.

The value of the process lies not so much in improving the ultimate recovery as in increasing the producing rate and yielding a response that is almost immediate upon cessation of steam injection. The primary benefits of the process are the reduction of oil viscosity near the well and the cleaning of the well bore.

Steam drive (also referred to as steam flooding or steam displacement) involves the injection of steam into a group of outlying wells to push oil toward the production wells. In this process the heat is pushed into the perimeters of the reservoir to displace oil and reduce viscosity. To ensure high rates of production at the wellhead, steam flooding projects are typically conducted jointly with cyclic steam injection in the production wells.

The steam-saturated zone, in the reservoir whose temperature is approximately that of the injected steam, moves oil to the production well by steam distillation of the oil, solvent extraction, and a gas drive. As the steam cools and condenses, a zone of hot water is formed which floods the formation. Oil recovery efficiency ranges from 35 to 50% of the reservoir oil in place, depending on oil and reservoir characteristics.

Over twenty-five years ago, the first commercial thermal recovery operations involving steam were started. The center of this activity in the United States was California, and many of these operations continue today. Cyclic steam (or steam soak) was the technique of preference in the ealy days because it stimulated here-to-fore wells of very low productivity. Steam drive (or steam displacement), on a sustained basis, did not begin until the early 1960's, when cyclic steam production began to decline (Matthews, C. S., "Steamflooding", Trans. SPE, Vol 275, Pg 465, 1983.).

In California, there are now more than 350,000 barrels per day of heavy viscous oil being produced as the result of steam injection (Brigham, W. E., "Thermal Oil Recovery in 1987", Second Annual International Enhanced Oil Recovery Conference, June, 1987, Anaheim, Calif. A portion of this is due to steam stimulation (cyclic steam), but the majority comes from steam displacement (steam drive). As these projects have matured, problems began to arise. For example, in steam drive fields the steam eventually "breaks-through" or "channels" to a producing well, and the sweep efficiency declines. Also, there is a continuing problem of moving heavy viscous oil to the producing wells.

The "channeling problem" has been studied by various investigators, and it is believed that this problem can be reduced by the use of foaming agents. The polymeric foaming agents have been evaluated in the laboratory and appear to be useful in minimizing channeling (Navratil, M., Sovak, M., and Mitchell, M. S., "Formation Blocking Agents: Applicability in Water and Steam-Flooding", 58th Annual SPE Conference, San Francisco, Calif., October 1983). However, only a limited number of field tests have been reported as of this date (Doscher, T. M., Kuuskrua, V. A., Hammershaimb, E. C., "Analysis of Five field Tests of Steamdrive Additives", 58th Annual SPE Conference, San Francisco, Calif., October 1983).

Another approach to increasing recovery during steam flooding is the use of surfactants. In one field test, a surfactant which is referred to as a "thin film spreading agent" was used, and the results were encouraging in three of the four wells under test (Adkins, J. D., "Field Results of Adding Surfactant to Cyclic Steam Wells" 58th Annual SPE Conference, San Francisco, Calif. October 1983). In still another field test, an additive containing sodium metasilicate was used during cyclic steam injection (Mbaba, P. E, Caballero, E. P., "Field Application of an Additive Containing Sodium Metasilicate During Steam Stimulation", 58th Annual SPE Conference, San Franscico, Calif., October 1983).

Although many of the above cited materials have shown some encouraging results, none have been universally accepted as a means of increasing oil recovery during steam stimulation or steam displacement.

FIELD OF INVENTION

The invention relates to recovery of oil from underground deposits using one of the steam mediated oil recovery processes. The invention further relates to the area of fluorochemicals, in particular those having one or more perfluoro groups.

A number of fluorochemicals have been used in oil recovery processes for a variety of reasons. For example U.S. Pat. No. 4,018,689 describes the use of (perfluorooctylsulfonamido propyl)(trimethyl)ammonium iodide to reduce the surface tension of aqueous fluids used in oil recovery. Canadian Pat. No. 1,207,517, corresponding to U.S. patent application No. 419,294, now U.S. Pat. No. 4,476,931, filed Sept. 17, 1982, discusses perfluorinated quaternary ammonium iodides in waterflooding oil recovery processes. U.S. Pat. No. 4,565,639 discloses the use of perfluoroalkylpolyoxyalkylene compounds to increase petroleum and gas production from water block reservoirs.

U.S. Pat. No. 4,536,304 discloses the use of perfluoroalkyl polyoxyalkylene ammonium compounds to reduce migration of fines in an oil recovery process. Quaternized perfluoropolyoxyalkylenes are also described as biocide enhancers in polymer flooding oil recovery processes in European application No. 119,704, corresponding to U.S. Pat. application No. 476,003, filed Mar. 17, 1983.

In German Offenlegungsschrift No. DE 3,306,593, corresponding to U.S. application No. 355,990, now U.S. Pat. No. 4,440,653, perfluoroalkyl polyoxyalkylenes and their esters are taught as suitable foaming compounds for use in oil recovery. German Offenlegungsschrift No. DE 2,922,928, corresponding to U.S. application No. 944,820, filed Sept. 22, 1978, now abandoned discloses perfluoroalkyl containing compounds suitable for waterflooding oil recovery.

Additional fluorochemical compounds are mentioned in U.S. Pat. Nos. 4,425,242, 4,432,882, 4,460,791, and 4,594,200 in connection with oil recovery processes. However, each of these mentions compounds in processes which are distinct from the heat injection systems.

OBJECTS OF THE INVENTION

An object of the invention is to provide a method for substantially increasing the total yield of oil obtainable from oil containing deposits.

A further object of the invention is to provide a method by which previously economically non-recoverable oil deposit reserves can be economically harvested.

A third object of the invention is to provide a method of oil recovery suitable for a wide variety of oil deposit types.

SUMMARY OF THE INVENTION

The invention is a heat mediated oil recovery process wherein a fluorochemical of the formula $$[(R_f)_n-(R')_p]_m Z \qquad (I)$$

is introduced into an oil bearing formation. The formation is heated and pressurized and the oil released therefrom is recovered.

DETAIL DESCRIPTION OF THE INVENTION

The invention is an oil recovery process which requires heat induction into the formation containing the oil or oil yielding component.

The compounds useful in the instant invention are of formula I $$[(R_f)_n(R')_p]_m Z \qquad (I)$$

wherein each $R_f$ is independently a perfluoro or omega-hydroperfluoro aliphatic group, each of which is independently uninterrupted or interrupted by a carbonyl, a carboxy, a carbonylamino, an oxygen, a sulfur, a sulfinyl, or a sulfonyl group; n is 1-3 and p is 0 or 1 provided that when p is 0, n is 1; m is 1-5000; each $R'$ is independently an organic linking group joining $R_f$ and $Z$ and has a valency of $n+1$; and $Z$ is a hydrocarbyl containing residue of valency m.

Preferably each $R_f$ has independently up to 20 carbon atoms, more preferably each $R_f$ has at least 4 carbon atoms, and more preferably 6-10 carbon atoms, most preferably 6 to 8 carbon atoms. Advantageously, $R_f$ has 6 carbon atoms. The suitable $R_f$ groups are inert, stable, oleophobic, and hydrophobic fluoroaliphatic groups. They are preferably selected from straight or branched perfluoroalkyl, perfluoroalkenyl, perfluoroalkoxy substituted perfluoroalkyl, and omega-hydro perfluoroalkyl. Most preferably, $R_f$ is a perfluoroalkyl group or a perfluoroalkoxy substituted perfluoroalkyl group, each $R_f$ most preferably having about 4 to about 20 carbon atoms.

n is preferably 1 or 2, most preferably 1.

The nature of the di to tetravalent organic linking group $R'$, when present, is not critical as long as it performs the essential function of bonding the fluoroaliphatic group, $R_f$, to the oleophilic organic radical Z.

In one sub-embodiment, $R'$ is an organic divalent linking group which covalently bonds the Rf group to the group Z.

Thus, $R'$ may, for example, be a divalent group, $R°$, selected from the following:

—$C_1$—$C_y$ alkylene—,
—phenylene—,
—$C_1$—$C_y$ alkylene—$R_1$—$C_1$—$C_y$ alkylene—,
—$C_1$—$C_y$ alkylene—$R_1$—,
—$R_1$—$C_1$—$C_y$ alkylene—,
—$R_1$—$C_1$—$C_y$ alkylene—$R_1'$—
—$R_1$—,
—$R_1$—phenylene—,
—$R_1$—phenylene—$R_1'$—,
—$R_1$—phenylene—$C_1$—$C_y$ alkylene—, or
—phenylene—$R_1$—, wherein, in each case, y is 10 but preferably 8, and said alkylene and phenylene are independently unsubstituted or substituted by hydroxy, halo, nitro, carboxy, $C_1$-$C_6$ alkoxy, amino, $C_1$-$C_6$ alkanoyl, $C_1$-$C_6$ carbalkoxy, $C_1$-$C_6$ alkanoyloxy or $C_1$-$C_6$ alkanoylamino. The alkylene moiety may be straight or branched chain or contain cyclic alkylene moieities, such as cycloalkylene or norbornylene. each $R_1$ and $R_1'$ independently represent: —N($R_2$)—, —CO—, —N($R_2$)CO—, —CON($R_2$)—, —N($R_2$)COO—, —OCO—N($R_2$)—, —S—, —SO—, —SO$_2$—, —N($R_2$)SO$_2$—, —SO$_2$N($R_2$)—, —N($R_2$)CON($R_2$)—, —COO—, —OCO—, —SO$_2$—, —OSO$_2$—, —OSO$_2$O —OCOO—,

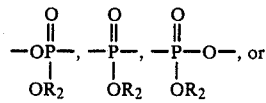

—O—, where $R_2$ is hydrogen, $C_1$-$C_6$ alkyl or $C_1$-$C_6$ alkyl substituted by $C_1$-$C_6$ alkoxy, by halo, by hydroxy, by carboxy, by $C_1$-$C_6$ carbalkoxy, by $C_1$-$C_6$ alkanoyloxy or $C_1$-$C_6$ alkanoylamino. Also, if desired, the amino group —N($R_2$)—, above, may be in quaternized form, for example of the formula

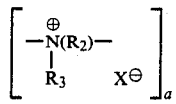

wherein a is 1, $R_3$ is hydrogen or $C_1$-$C_6$ alkyl which is unsubstituted or substituted by hydroxy, by $C_1$-$C_6$ alkoxy, by $C_1$-$C_6$ alkanoyloxy or by $C_1$-$C_6$ carbalkoxy and X is an anion, such as halo, sulfato, lower alkylsulfato such as methylsulfato, lower alkyl-sulfonyloxy such as ethyl sulfonyloxy, lower alkanoyloxy such as acetoxy or the like.

As an alternate sub-embodiment, R', while being covalently bonded to both $R_f$ and Z may contain an ionic bridging group as an integral part of the chain linking $R_f$ to Z.

Thus, for example, R' may be selected from the following:

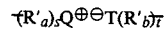

or

where
$R_a'$ is $C_1$-$C_6$ alkylene—, —phenylene—, $C_1$-$C_6$ alkylene—$R_1$— $C_1$-$C_y$ alkylene—, —$R_1$—$C_1$—$C_y$ alkylene—, —$R_1$—phenylene— or —$R_1$—phenylene—$C_1$—$C_y$ alkylene—;

$R_b'$ is —$C_1$—$C_y$ alkylene, —phenylene—, —$C_1$—$C_y$ alkylene— —$R_1$—$C_1$—$C_y$ alkylene—, —$C_1$—$C_y$ alkylene—$R_1$—, —phenylene—$R_1$ or —$C_1$—$C_y$ alkylene-phenylene—$R_1$—;

s and t are independently 0 or 1; y is 10 but preferably 8; T is an anionic group, $R_f$ is as defined above and Q is a cationic group and wherein said alkylene and phenylene of $R_a'$ and $R_b'$ are independently unsubstituted or substituted by hydroxy, halo, nitro, carboxy, $C_1$-$C_6$ alkoxy, amino, $C_1$-$C_6$ alkanoyl, $C_1$-$C_6$ carbalkoxy, $C_1$-$C_6$ alkanoyloxy or $C_1$-$C_6$ alkanoylamino.

Suitable anionic groups for T include carboxy, sulfoxy, sulfato, phosphono, and phenolic hydroxy. Suitable cationic groups for Q include amino and alkylated amino, such as those of the formula

where each $R_2$ and $R_3$ are as defined above.

A single molecule may have some, all, or none of the $R_f$ groups being linked to Z through an ionic bridge. When more than one ionic bridge is present in a molecule, they may be the same or different. However, in any one chain between any one $R_f$ and Z, only a single ionic bridge may be present or two such bridges may be present if a di terminal $T^{\ominus}$ group links two $Q^{\oplus}$ terminal groups or a diterminal $Q^{\oplus}$ group links two $T^{\ominus}$ terminal groups. In these di-ionic bridge chains, one of the mono ionic terminated groups is covalently bound to $R_f$ and the other (of the same charge) is covalently bound to Z. The di-ionic terminated group of opposite change links the two.

Where n is 2 and p is 1, R' is an organic trivalent group. Suitable such groups include those of the formula:

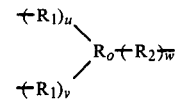

wherein $R_1$ and $R_2$ are defined above; u, v and w are independently 1 or 0 and $R_o$ is alkanetriyl, arenetriyl or aralkanetriyl of up to 18 carbon atoms which may be interrupted by one or more hetero atoms such as oxygen, sulfur or imino. Typical groups are analogous to those mentioned when n and p are 1 except that an additional valency is present, such as the following wherein the Z group attached thereto is also shown.

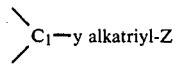

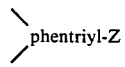

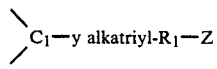

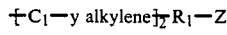

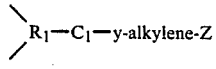

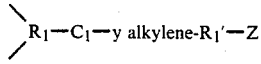

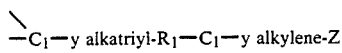

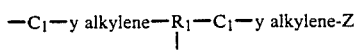

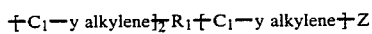

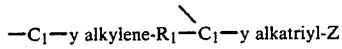

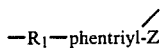

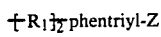

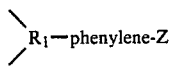

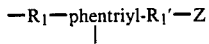

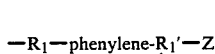

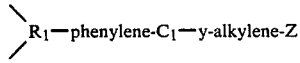

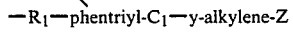

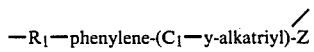

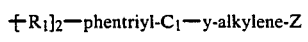

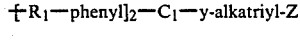

and

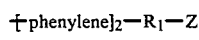

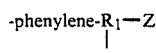

When n is 3 and p is 1, R' is a tetravalent group. Suitable groups are of the formula

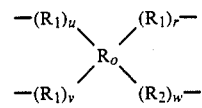

where R, u, v, and w are independently o or 1, $R_o$ is alkenetetryl, arenetetryl or aralkanetetryl of up to 18 carbon atoms which may be interrupted by one or more hetero atoms such as oxygen, sulfur, or imino, and $R_1$, and $R_2$ are as defined above.

Typical tetravalent R' groups, with the attached Z being shown, include:

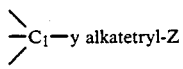

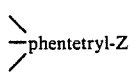

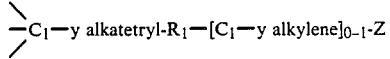

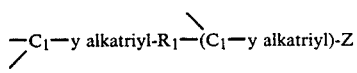

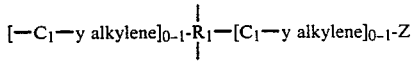

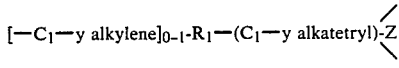

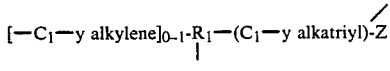

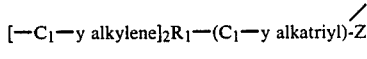

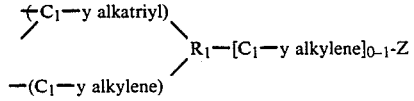

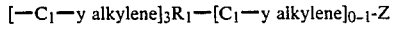

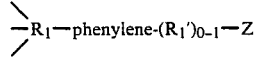

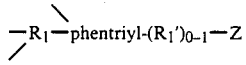

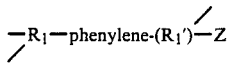

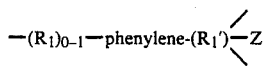

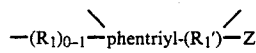

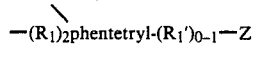

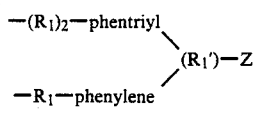

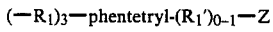

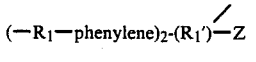

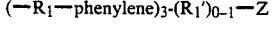

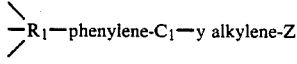

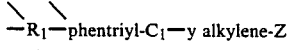

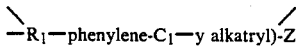

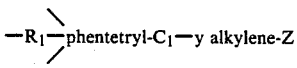

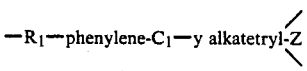

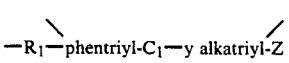

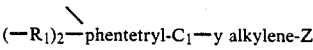

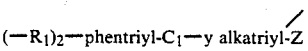

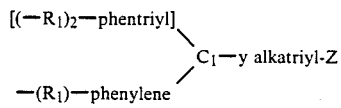

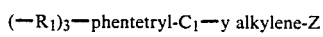

$(-R_1-phenylene)_2-(C_1-y\ alkatetryl)-Z$ and $(-R_1-phenylene)_3-C_1-y\ alkatetryl-Z$ When R' is trivalent and requires either $R_1$ or $R_1'$ to be trivalent then R' must be a group having at least one $R_2$ group, and at least one of the $R_2$ groups is a group as previously defined, other than hydrogen, and having an additional available valence, or $R_2$ is a free valence.

When the $R_1$ or $R_1'$ groups are necessarily tetravalent, either two $R_2$ groups must be present meeting the above requirements or one $R_2$ group meets the above requirement but has 2 additional valencies over those groups mentioned when $R_1$ and $R_1'$ are divalent.

An alternate subembodiment of the trivalent and tetravalent R', while being covalently bound to each $R_f$ and Z, may contain an ionic bridging group as an integral part of the chain linking any particular $R_f$ to Z. Suitable such groups are of the formula

as defined above and may interrupt or replace a portion of the R' linking group between any one $R_f$ and Z.

Preferably, when more than one $R_f$ to Z link contains an ionic bridge, the R' group traced from each such linked $R_f$ through the ionic bridge toward Z is the same.

The oleophilic organic radical Z can vary widely and is, in general, not critical.

For example, suitable oleophilic organic radicals, when m is 1 include, without limitation, conventional hydrophobic-oleophilic higher alkyl or alkenyl of 6–24 carbon atoms which are unsubstituted or substituted e.g. by chloro, bromo, alkoxy of up to 18 carbon atoms, nitro, alkanoyl of up to 18 carbon atoms, alkylmercapto of up to 18 carbon atoms, amino, $C_1$–$C_{18}$ alkylamino, or di-$C_1$–$C_{18}$ alkylamino; an aryl group, such as phenyl or naphthyl, the phenyl and naphthyl moiety of which is unsubstituted or substituted by alkyl of up to 20 carbon atoms, alkoxy of up to 20 carbon atoms, alkanoyl of up to 20 carbon atoms, alkanoyloxy of up to 20 carbon atoms or mono- or di-alkylamino of up to 20 carbon atoms; mono- or di-$C_6$–$C_{24}$-alkylamino-$C_2$–$C_7$-alkylene; alkoxyalkylene of 4–20 carbon atoms which is unsubstituted or substituted by one or two $C_6$–$C_{24}$ carbalkoxy or $C_6$–$C_{24}$ carbamoyl groups; poly-$C_6$–$C_{24}$alkoxy-higher alkyl or alkenyl of 6–24 carbon atoms; a heterocyclic group such as piperidino, piperazino, azepino, N-pyridinium, morpholino, benztriazolyl, triazinyl, pyrrolidino, furanyl, tetrahydrofuranyl and the like, which are unsubstituted or substituted e.g. by halo, alkoxy of up to 18 carbon atoms, nitro, alkanoyl of up to 18 carbon atoms, alkylmercapto of up to 18 carbon atoms, amino or alkylamino of up to 18 carbon atoms; poly-$C_2$–$C_3$ alkoxy-phenyl, the phenyl group of which is unsubstituted or substituted by alkyl of up to 20 carbon atoms; a group of the formula —X—(CH$_2$CH$_2$CH$_2$CH$_2$O)$_g$R'' or of the formulae

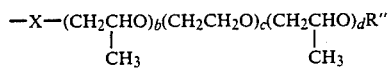

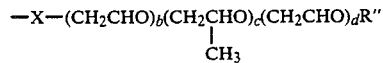

wherein X is oxygen or a bond when X is not bound to an oxygen, or X is a bond when it is bound to an oxygen, g is 2–80, b is 0–40 preferably 2–40, c is 0–80, preferably 2–80, d is 0–40, preferably 2–40, with b+c+d being at least 1, and R'' is H or C$_1$-C$_4$ alkyl; a group of the formula

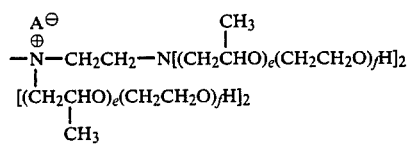

wherein each e is 3–20, and each f is 3–20 and A is an anion; a group of the formula

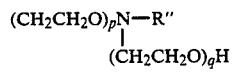

where p is 1–15 and q is 1–15 and R'' is alkyl of 6 to 22 carbon atoms or alkanoyl of 6 to 22 carbon atoms; or a group of the formula

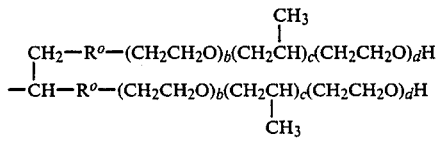

where R$^o$, b, c and d are as defined above.

Also, where m is 2 or 3, Z represents an oleophilic organic divalent or trivalent radical. Suitable such radicals include those wherein Z is an oleophilic di- or trivalent aliphatic, carbocyclic, heterocyclic or aromatic group. For example, when m is 2, Z may represent an oleophilic polyalkyleneoxy containing group, the terminal members of which are covalently bonded to R'; an arylene group, such as phenylene or naphthalene which are unsubstituted or substituted, e.g. by alkyl up to 20 carbon atoms, alkoxy of up to 20 carbon atoms, alkanoyloxy of up to 20 carbon atoms, alkanoylamino of up to 20 carbon atoms, halo, amino or alkylamino of up to 20 carbon atoms, or the like; an alkylene or alkenylene group of up to 20 carbon atoms which is unsubstituted or substituted, e.g. by alkoxy of up to 20 carbon atoms, alkylamino of up to 20 carbon atoms, alkanoyl of up to 20 carbon atoms, alkanoylamino of up to 20 carbon atoms, or alkanoyloxy of up to 20 carbon atoms; a heterocyclic group, such as N,N'-piperazinylene, triazinylene, or the like.

An alternate group of compounds according to formula I are those wherein the R$_f$ group is pendant to an oleophilic polymer backbone.

Suitable oleophilic polymer backbones are those derived from condensation polymers and addition polymers.

For example, the group Z may contain condensation units of the formula:

wherein R$_3$ is an aliphatic triradical or tetraradical of 2–50 carbon atoms which is covalently bonded to the (R$_f$)$_n$(R')$_p$ groups and is selected from the group consisting of branched or straight chain alkylene, alkylenethioalkylene, alkyleneoxyalkylene or alkyleneiminoalkylene; and D, together with the —NHCO— groups to which it is attached, is the organic divalent radical resulting from a diisocyanate.

In a preferred subembodiment, D is alkylene of 2 to 16 carbon atoms; cycloaliphatic of 6 to 24 carbon atoms; phenylene that is unsubstituted or substituted by lower alkyl, lower alkoxy or chloro; diphenylene; phenyleneoxyphenyl, phenylene (lower alkylene) phenylene, or naphthylene, where the aromatic ring is otherwise unsubstituted or substituted by lower alkyl, lower alkoxy or chloro. In an alternate embodiment, up to about 85 percent of the [(R$_f$)$_n$(R'$_p$)]$_m$R$_3$ groups may be replaced by the biradical of a bis-(2-aminopropyl)ether of a polyethylene oxide; an aliphatic polyol of up to 18 carbon atoms; a di- or polyalkoxylated aliphatic or aromatic tertiary amine of up to 18 carbon atoms; a lower alkylene polyether; or a hydroxyterminated polyester having a hydroxyl number from 40 to 500.

Suitable preferred condensation polymers and their preparations are described, inter alia, in U.S. Pat. Nos. 3,935,277, 4,001,305, 4,046,944 and 4,054,592.

Suitable oleophilic polymer backbones derived from addition polymers comprising the group Z include those wherein up to about 5000 groups of the formula (R$_f$)nR'$_p$— are attached to an oleophilic hydrocarbyl containing polymeric backbone. Suitable polymers include those wherein the addition polymer contains up to about 5000 units of the formula

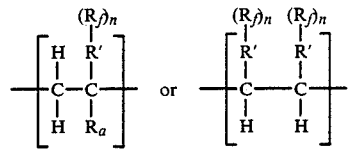

wherein R$_f$, n and R' are defined above, and R$_a$ is hydrogen or lower alkyl. Preferably R$_a$ is hydrogen or methyl.

In a preferred subembodiment of the compounds wherein Z is a polymer, R' is as previously defined except that it cannot have an —O—OC— group directly bound to Z with the carbonyl being attached to Z. In another subembodiment, R' is attached to Z via an R' terminal other than —OOC—, —COO—, or —OOCO—.

Such addition polymers are generally prepared, by methods known in the art, e.g. in U.S. Pat. No. 3,282,905, U.S. Pat. No. 3,491,169 and U.S. Pat. No. 4,060,681, by homo- or co-polymerizing the corresponding monomer of the formula

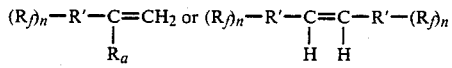

wherein $R_f$, n, R', and $R_a$ are defined above, optionally with polymerizable vinylic comonomers.

Suitable comonomers include:

Ethylene and chloro, fluoro- and cyano- derivatives of ethylene such as vinyl chloride, vinylidene chloride, vinyl fluoride, vinylidene fluoride, acrylonitrile, methacrylonitrile, tetrafluoroethylene, trifluorochloroethylene, hexafluoropropylene; acrylate and methacrylate monomers, particularly those with 1 to 12 or 18 carbon atoms in the ester groups such as n-propyl methacrylate, 2-methyl cyclohexyl methacrylate, methyl methacrylate, t-butyl methacrylate, n-butyl methacrylate, methyl acrylate, ethyl acrylate, propyl acrylate, butyl acrylate, 3-methyl-1-pentyl acrylate, octyl acrylate, tetradecyl acrylate, s-butyl acrylate, 2-ethylhexyl acrylate, 2-methoxyethyl acrylate, and phenyl acrylate; dienes particularly 1,3-butadiene, isoprene, and chlorprene, 2-fluoro-butadiene, 1,1,3-trifluorobutadiene, 1,1,2,3-tetrafluoro butadiene, 1,1,2-trifluoro-3,4-dichlorobutadiene and tri- and pentafluoro butadiene and isoprene; nitrogen-vinyl monomers such as vinyl pyridine, N-vinylimides, amides, vinyl succinimide, vinyl pyrrolidone, N-vinyl carbazole and the like;

styrene and related monomers which copolymerize readily with the novel esters of this invention such as o-methylstyrene, p-methylstyrene, 3,4-dimethyl styrene, 2,4,6-trimethyl styrene, m-ethyl styrene, 2,5-diethyl styrene;

vinyl esters, e.g. vinyl acetate, vinyl esters of substituted acids, such as for example, vinyl methoxyacetate, vinyl trimethylacetate, vinyl isobutyrate, isopropenyl butyrate, vinyl lactate, vinyl caprylate, vinyl pelargonate, vinyl myristate, vinyl oleate and vinyl linoleate; vinyl esters of aromatic acids, such as vinyl benzoate;

alkyl vinylethers, such as methyl vinyl ether, isopropyl vinyl ether, isobutyl vinyl ether, 2-methoxy ethyl vinyl ether, n-propyl vinyl ether, t-butyl vinyl ether, isoamyl vinyl ether, n-hexyl vinyl ether, 2-ethylbutyl vinyl ether, diisopropylmethyl vinyl ether, 1-methylheptyl vinyl ether, n-decyl vinyl ether, n-tetradecyl vinyl ether, and n-octadecyl vinyl ether.

Propylene, butylene and isobutylene are preferred α-olefins useful as comonomers with the novel fluoro monomers of the present invention with straight and branched chain α-olefins useful with up to 18 carbon atoms in the side chain.

Suitable candidate compounds of the formula I containing one or more inert stable oleophobic and hydrophobic fluoroaliphatic groups, $R_f$, and an oleophilic hydrocarbyl containing residue, represent a well known class of compounds widely described in the literature.

For example, compounds of the formula I wherein n and m are 1 are described in U.S. Pat. Nos. 4,460,791; 4,310,698; 4,302,378; 3,575,899; 3,575,890; 4,202,706; 3,346,612; 3,575,899; 3,989,725; 4,243,658; 4,107,055; 3,993,744; 4,293,441; 4,107,055; 3,839,343; JP No. 77/88,592; Ger. Offen. No. 1,966,931; Ger. Offen. No. 2,245,722; JP No. 60/181,141; EP No. 140,525; JP No. 53/31582; CH No. 549,551; EP No. 74,057; FR No. 2,530,623; Ger. Offen. No. 2,357,780; JP No. 58/70806; Ger. Offen. No. 2,344,889; U.S. Pat. No. 3,575,890; U.S. Pat. No. 3,681,329; Ger. Offen. No. 2,559,189; U.S. Pat. No. 3,708,537; U.S. Pat. No. 3,838,165; U.S. Pat. No. 3,398,182 Ger. Offen. No. 2,016,423; Ger. Offen. No. 2,753,095, Ger. Offen. No. 2,941,473; Ger. Offen. No. 3,233,830; JP No. 45/38,759; JP No. 51/144,730; Ger. Offen. No. 3,856,616; Ger. Offen. No. 2,744,044; JP No. 60/151,378; Ger. Offen. No. 1,956,198; and GB No. 1,106,641.

Compounds of the formula I wherein n is 2 or 3, or m is 2 to 4 are described, for example, in U.S. Pat. No. 4,219,625; Ger. Offen. No. 2,154,574; Ger. Offen. No. 2,628,776; Text. Res. J., 47 (8), 551–61 (1977); U.S. Pat. No. 4,268,598; U.S. Pat. No. 3,828,098; Ger. Offen. No. 1,938,544; Ger. Offen. No. 2,017,399; Ger. Offen. No. 2,628,776; Ger. Offen. No. 1,956,198; JP No. 47/16279; Ger. Offen. No. 1,938,545; Ger. Offen. No. 1,916,651; U.S. Pat. Nos. 3,492,374; 4,195,105; Ger. Offen, No. 2,009,781; U.S. Pat. No. 4,001,305; and GB No. 1,296,426.

Compounds where n is 1 to 3 and m is in excess of 4, up to for example about 500, are described, inter alia, in U.S. Pat. Nos. 3,935,277; 2,732,370; 2,828,025; 2,592,069; 2,436,144; 4,001,305; 4,046,944; 4,054,592; 4,557,837; 3,282,905, 3,491,169; and 4,060,681.

The formation from which recovery is sought is heated to a temperature of about 30° C. to about 160° C., preferably about 160° C. After the formation has been heated and in contact with the compound of formula I, the oil can be recovered through the heat injection point or through a second production site.

The compound of formula I can be introduced to a formation, before, after, or during steaming. Preferably, the compound of formula I is introduced to the formation while the formation is in the heated state, more preferably simultaneously with the steam injection. The degree and length of time of heating will vary on formation conditions well known in the art and upon the particular oil and/or oil yielding component content of the formation.

As can be well appreciated, the instant method can be used with formation which have never had their oil or oil yielding component content previously harvested, as well as those which have been already subjected to primary, and enhanced oil recovery processes.

The compound of formula I is generally introduced in either the pure state or in a solution or suspension in a suitable carrier. Preferably, the carrier is a solvent for the compound, preferably selected from the group of aromatic solvents such as toluene, xylene and the like, or from petroleum derived solvents such as naphtha. The compound of formula I may also be advantageously used in the form of an emulsion. The compound of formula I, when present in a carrier therefor, is preferably present in a concentration of at least 1%, preferably about 1 to about 80% more preferably 5-50%, most preferably 5-15% by weight. The compound of formula I is typically used in an amount of 5 to 5,000 parts per million based on the oil to be recovered.

Having fully described the invention, the following examples are provided to exemplify particular embodiments, but do not limit the invention.

The efficiency of fluorochemicals of formula I as recovery enhancing additives was determined by core flow studies in which oil-containing sand was used.

The sand selected was taken from cores from the Kern River field, near Bakersfield, Calif. The core material was crushed, taking care not to create an inordinate quantity of fines. Since the core material had been in storage for a long period of time, solvent extraction showed very little oil and no water in the cores. Therefore, it was decided to reblend the sand with the oil, and to recreate a "typical" Kern River Sand. This was accomplished by adding oil to the crushed core material in a heated container, stirring, and re-mixing until the blend was consistent. Twenty samples of the blend were taken and averaged 18.7% saturation (18.3% to 19.1%) of oil by solvent extraction. The sand pack containers were stainless steel pipes, one inch in diameter by 27 or 28 inches in length. End caps containing retainer screens and packed with glass wool were used to hold the blend in place. A measured (by weight) amount of blend was "tamped" in place and the end caps installed. The pipes were wrapped with heating tape and attached to the steam generator. The downstream gage, valve, and tubing were also heat "traced" to insure free passage of the oil out of the pack.

The steam generator was filled with water, and the heat turned on. It was decided to operate the generator such that 100% quality steam would enter the pack at 500° F. To accomplish this the generator was placed on automatic control, and the rate was adjusted by reading the pressure gage on the generator, and adjusting the exit valve to maintain a constant pressure (680 psia) in generator. The steam discharged from the generator was replaced by water from a constant rate pump (approximately 200 cc/hr). As the water (or steam) entered the pack, it was immediately flashed to steam because the downstream exit pressure was maintained at 35 psia by means of the downstream valve.

The pack was maintained at a constant temperature (230° F.) to enable the pipe to be pseudo-adiabatic. The exit end of the pack and the oven into which the produced fluids were discharged were maintained at 210° F.

A calculated number of pore volumes of water as steam was displaced through the pack. The pack was removed from the set-up and allowed to cool. The contents were removed from the pack and measured (by weight) to determine the amount of oil that was removed during the test.

The following results were obtained.

| Pore Volumes of Steam Injected | Oil Recovered (% of Total) |
| --- | --- |
| 1 | 45.3 |
| 5 | 50.2 |

When additives were being tested one ml of a solution of the additive was injected in the upstream end of the pipe before steaming. Solution strengths were adjusted so doping levels were 250 ppm based on the oil. For a fluorochemical to be considered effective a 10% enhancement of recovery (over the control) should be observed when five pore volumes of steam are used.

EXAMPLE 1

This example is comparative and demonstrates the superiority of a fluorinated compound (1) over its non fluorinated analog (2) Both compounds were tested according to the preceeding procedure using 5 pore volumes of steam

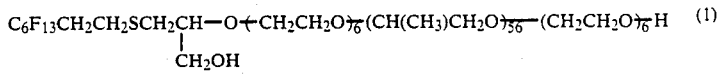

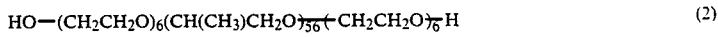

Eighty two percent of the oil was recovered when compound (1) was used which corresponds to a 65% enhancement over the control. Compound (2) demonstrated no enhancement over the control giving a 45.9% oil recovery.

When one pore volume of steam was used in conjunction with compound (1) 67% of the oil was recovered indicating a 49% enhancement over the control.

EXAMPLE 2

A 300 ml, 3-neck reaction flask equipped with stirrer, nitrogen inlet, condenser and thermometer was charged with 30 g (0.03 mol) $(R_f)_2$-diol* and 35 g methylethyl ketone (MEK) which had been dried over molecular sieves. After all diol had dissolved, 4.4 g, 3,3,4-trimethyl hexane-1,6-diisocyanate (TMDI) (0.02 mol) were added followed by 0.01 g triethylemine. The mixture was heated to reflux for three hours, after which time free —NCO groups were not detected by IR. Then another 4.4 g TMDI were added, dissolved in 4.4 g MEK followed after ½ hour by 4.5 g bis-2-aminopropyl ether of polyethylene glycol of MW 900 (BAPG-900) (0.05 mol) and 8.8 g TMDI together with 54 g MEK. The mixture was kept at reflux for 4 more hours at which time no —NCO was detectable by IR. Heating was discontinued and 93 g water were slowly added under vigorous stirring. A yellowish, slightly turbid solution resulted, whose solids content was adjusted to 25%.

*The diol has the formula

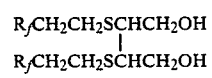

The obtained condensation polymer was screened using five pore volumes of steam. Sixty seven percent of the oil was recovered corresponding to a 35% enhancement over the control. where $R_f$ is a mixture of perfluoroalkyl chains consisting of $C_6F_{13}$, $C_8F_{17}$ and $C_{10}F_{22}$ (U.S. Pat. No. 4,001,305).

EXAMPLE 3

A mixture of

(0.01957 mols) and 10.33 g

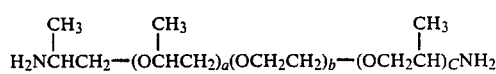

(where a + c = 3.5, b = 20.5)

was heated at 80°–85° C. for 8 hours. The reaction mixture was cooled to 45° C. Then 1.29 g acetic acid (0.0215 mols) were added and the reaction mixture was stirred for ½ hour. A viscous liquid with the structure,

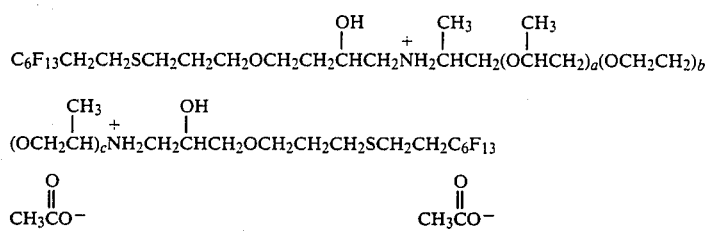

$$C_6F_{13}CH_2CH_2SCH_2CH_2CH_2OCH_2CH_2\overset{OH}{\underset{|}{C}}HCH_2\overset{+}{N}H_2\overset{CH_3}{\underset{|}{C}}HCH_2(O\overset{CH_3}{\underset{|}{C}}HCH_2)_a(OCH_2CH_2)_b$$

$$(O\overset{CH_3}{\underset{|}{C}}HCH_2)_c\overset{+}{N}H_2CH_2\overset{OH}{\underset{|}{C}}HCH_2OCH_2CH_2CH_2SCH_2CH_2C_6F_{13}$$

$$\underset{CH_3CO^-}{\overset{O}{\underset{\|}{}}} \qquad \underset{CH_3CO^-}{\overset{O}{\underset{\|}{}}}$$

where a+c=3.5 and b=20.5, was obtained in quantitative yield.

The above compound was screened using the procedure from example 1 and 5 pore volumes of steam. Fifty eight percent of the oil was recovered with corresponds to a 16% enhancement over the control.

EXAMPLE 4

Dimethyl octadecylamine (0.53 g, 0.0018 mols) was added to 1.00 g $C_6F_{13}CH_2CH_2S(CH_2)_{10}COOH$ (0.0018 mols) dissolved in 29.02 g toluene. The reaction mixture was heated at 80° C. for 4 hours. A product with the structure

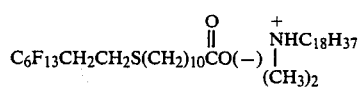

$$C_6F_{13}CH_2CH_2S(CH_2)_{10}\overset{O}{\underset{\|}{C}}O(-) \quad \overset{+}{\underset{|}{N}}\underset{(CH_3)_2}{HC_{18}H_{37}}$$

was obtained in toluene.

The above compound was screened using the procedure from example 1 and 5 pore volumes of steam. Eighty nine percent of the oil was recovered which corresponds to a 78% enhancement over the control.

EXAMPLE 5

The efficiency of Fluorad® FC-430, (a nonionic fluorochemical available from the 3M company) as a steam additive was tested using five pore volumes of steam.

Fifty nine percent of the oil was recovered which corresponds to a 18% enhancement over the control.

EXAMPLE 6

A compound of the formula

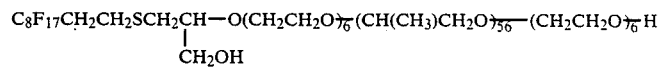

$$C_8F_{17}CH_2CH_2SCH_2\underset{CH_2OH}{\underset{|}{C}H}-O(CH_2CH_2O)_{\overline{6}}(CH(CH_3)CH_2O)_{\overline{56}}-(CH_2CH_2O)_{\overline{6}}H$$

was screened as a steam additive using the procedure from example 1 and 5 pore volumes of steam. Sixty four percent of the oil was recovered indicating a 28% enhancement over the control.

EXAMPLES 7-23

Based on the use of the previously described evaluation methods the following fluorochemicals exhibit usefulness as steam injection additives.

| Example # | Reference and Fluorochemical |
|---|---|
| 7 | Ger. Offen. DE 2245722<br>$F_3C(CF_2)_7(CH_2)_2S(CH_2)_{11}OH$ |
| 8 | Jpn. Kokai Tokkyo Kono JP 60/1811<br>$CH_3(CH_2)_{16}C(O)O(CH_2)_2(CF_2)_7CF_3$ |
| 9 | Eur. Pat. Appl. EP 140525<br>$CH_3(CH_2)_3(CH=CH)_3(CH_2)_7C(O)O(CH_2)_2N(CH_3)SO_2(CF_2)_7CF_3$ |
| 10 | U.S. Pat. No. 3,989,725<br>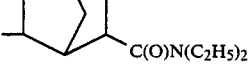 |
| 11 | Ger. Offen. DE 2357780<br>$CF_3(CF_2)_7CH(OH)CH_2NH(CH_2)_7CH_3$ |
| 12 | U.S. Pat. No. 4,202,706<br>$CF_3(CF_2)_7SO_2N(C_2H_5)(CH_2)_{11}OH$ |
| 13 | Jpn. Kokai Tokkyo Koho JP 60/15137<br>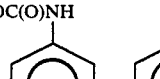 |
| 14 | Ger. Offen. DE 3,306,593<br>Poly[oxy(methyl-1,2-ethanediyl)],<br>α-(3,3,4,4,5,5,6,6,7,7,8,8,9,9,10,10,10-heptadecafluorodecyl)-ω-hydroxy- (9CI) |
| 15 | Fr. FR 2,117,416 |

-continued

| Example # | Reference and Fluorochemical |
|---|---|
|  | Poly[oxy(methyl-1,2-ethanediyl)], α-[2-[ethyl[(heptadecafluorooctyl)sulfonyl]amino]methylethyl]-ω-hydroxy- (9CI) |
| 16 | J. Econ. Entomol., 78(6), 1190-7<br>$H\text{-}[O(CH_2)_3]_{18}O(CH_2)_2NSO_2(CF_2)_7CF_3$<br>$\quad\quad\quad\quad\quad\quad\quad\quad\quad\quad\;\;\|$<br>$\quad\quad\quad\quad\quad\quad\quad\quad\quad\;(CH_2)_3CH_3$ |
| 17 | Eur. Pat. Appl. EP 144,844<br>$\ominus O_3S(CH_2)_2-\overset{CH_3}{\underset{CH_3}{\overset{\|}{\underset{\|}{N^\oplus}}}}-[CH_2\overset{CH_3}{\underset{\|}{CH}}O]_{13}CH_2\overset{CH_3}{\underset{\|}{CH}}-NH(CH_2)_2(CF_2)_7CF_3$ |
| 18 | Japan Kokai JP 53/31582<br>$\quad\quad\quad\quad\quad\quad\quad\quad\quad\quad\quad\quad\;\;CH_3$<br>$\quad\quad\quad\quad\quad\quad\quad\quad\quad\quad\quad\quad\;\;\|$<br>$CH_3(CH_2)_{16}C(O)(OCH_2CH_2)_5NSO_2(CF_2)_7CF_3$ |
| 19 | Jpn. Kokai Tokkyo Koho JP 58/70806<br>$CH_3(CH_2)_{17}CONH(CH_2)_6NHSO_2(CF_2)_7CF_7$ |
| 20 | U.S. Patent application 455,727<br>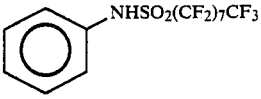 |
| 21 | U.S. Pat. No. 3,575,899<br>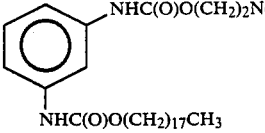 |
| 22 | Japan Kokai JP 51/144730<br>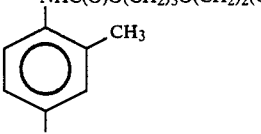 |
| 23 | Japan Kokai JP 51/151126<br>Poly[oxy(methyl-1,2-ethanediyl)],<br>ω-[(3,3,4,4,5,5,6,6,7,7,8,8,9,9,10,10,10-heptadecafluorodecyl)oxy]-<br>ω'-hydroxy-α,α'-[(methylphenylene)bis(iminocarbonyl)]bis- (9CI) |

What is claimed is:

1. A method of increasing steam mediated oil production using a steam injection recovery process, with one, two or more wells, which comprises
contacting a deposit containing crude oil or containing a crude oil generating material with an effective amount of a fluorochemical of formula I $$[(R_f)_n(R')_p]_m Z \qquad (I)$$

wherein
each $R_f$ is independently a straight or branched chain perfluoroalkyl, perfluoroalkoxy-perfluoroalkyl, omega-hydroperfluoroalkyl or perfluoroalkenyl, each $R_f$ independently having 4 to 20 carbon atoms,
n is 1, 2 or 3,
p is 0 or 1,
m is an integer of from 1 to about 5000,
R' is a direct bond when p is 0, or is an organic group having a valency of n+1, is convalently bonded to both $R_f$ and Z, and
when n is 1 and p is 1, R' is a divalent organic linking group bound to $R_f$ and to Z and is selected from the group consisting of $—(C_{1-10}\text{alkylene})_\alpha—R_1—(C_{1-10}\text{alkylene})_\beta—$ $—(R_1)_\alpha—[C_{1-10}\text{alkylene}]—(R_1'-)_\beta—$, $—(R_1)_\alpha\text{-phenylene-}(R_1')_\beta—$, and $—R_1—\text{phenylene}—C_{1-10}$ alkylene—, in each case being bound to Z through the bond shown on the right of the above formulae, wherein α and β are independently 0 or 1, said R' $C_{1-10}$ alkylene and R' phenylene being independently unsubstituted or substituted by hydroxy, halo, nitro, carboxy, $C_{1-6}$alkoxy, amino, $C_{1-6}$alkanoyl, $C_{1-6}$carbalkoxy, $C_{1-6}$alkanoyloxy, or $C_{1-6}$alkanoylamino, each $R_1$ and $R_1'$ being independently selected from —L—, —LCO—, —COL—, —L—COO—, —OOCL—, —L-$SO_2$—, —$SO_2$L—, —LCON($R_2$)—, —OP(O)-(O$R_2$)—, P(O)(O$R_2$)O—, —P(O)(O$R_2$)—, —CO—, —S—, —SO—, —$SO_2$—, —COO—, —OOC—, —$SO_2$—, —O$SO_2$—, —O$SO_2$O—, —OCOO—, and —O—; in which L is —N($R_2$)— or —N$^+$($R_2$)($R_3$)—; each $R_2$ being independently selected from H, and $C_{1-6}$alkyl which is unsubstituted or substituted by $C_{1-6}$alkoxy, by halo, by hydroxy, by carboxy, by $C_{1-6}$carbalkoxy, by $C_{1-6}$alkanoyloxy, or by $C_{1-6}$alkanoylamino; and $R_3$ is H or $C_{1-6}$alkyl which is unsubstituted or substituted by OH, by $C_{1-6}$alkoxy, by $C_{1-6}$alkanoyloxy, or by $C_{1-6}$carbalkoxy; and when L is $-N^{\oplus}(R_2)(R_3)-$, a counterion $X^{\ominus}$ is present; or said R' is interrupted or has a portion thereof replaced by an ionic bridge pair group $-Q^{\oplus}{\ominus}T-$ or $-T^{\ominus}{\oplus}Q$ wherein $T^{\ominus}$ is an anionic group selected from carboxy, sulfoxy, sulfato, phosphono, and phenolic hydroxy and $Q^{\oplus}$ is a cationic group selected from quaternary ammonium;

when n is 2 and p is 1, R' is a trivalent organic linking group covalently bound to two $R_f$ groups and to Z and selected from the group consisting of

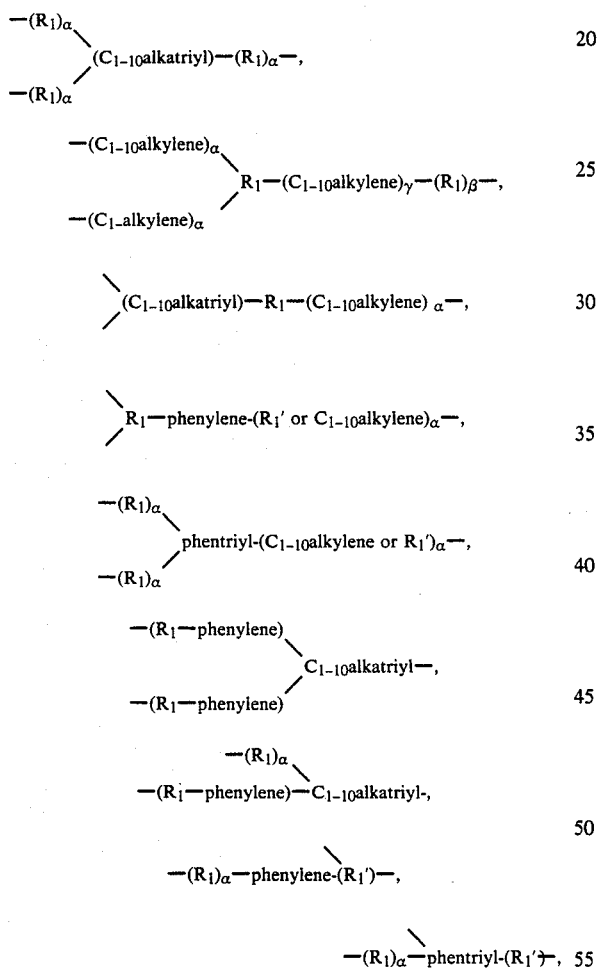

in each case being bound to Z through the bond shown on the right hand side of the above formulae, wherein each $\alpha$ is individually 0 or 1 $\beta$ is 0 or 1, and $\gamma$ is 0 or 1 but when $\beta$ is 1, $\alpha$ is 0, and $\gamma$ is 1; wherein each R' $C_{1-10}$alkylene, R' $C_{1-10}$alkatriyl, R' phenylene, and R' phentriyl is independently unsubstituted or substituted by hydroxy, halo, nitro, carboxy, $C_{1-6}$alkoxy, amino, $C_{1-6}$alkanoyl, $C_{1-6}$carbalkoxy, $C_{1-6}$alkanoyloxy or $C_{1-6}$alkanoylamino;

each $R_1$ and $R_1'$ being independently selected from $-L-$, $-L-CO-$, $-C(O)L-$, $-LCOO-$, $-OOCL-$, $-LSO_2-$, $-SO_2L-$, $-L-C(O)L-$, $-OP(O)-(OR_2)-$, $-P(O)(OR_2)O-$, $-P(O)(OR_2)-$, $-CO-$, $-S-$, $-SO-$, $-SO_2-$, $-COO-$, $-OOC-$, $-SO_2-$, $-OSO_2-$, $-OSO_2O-$, $-O-COO-$, and $-O-$; in which each L is independently $-NR_2-$ or $-N^+(R_2)(R_3)-$;

each $R_2$ being independently selected from a free valence, H, and $C_{1-6}$alkyl which is unsubstituted or substituted by $C_{1-6}$alkoxy, by halo, by hydroxy by carboxy, or by $C_{1-6}$alkanoylamino; or $R_2$ is a radical of $C_{1-6}$alkyl group which is unsubstituted or substituted by $C_{1-6}$alkoxy by halo, by hydroxy, by crboxy, or by $C_{1-6}$alkanoylamino, and has an additional free valance; and $R_3$ is a valence, H, or $C_{1-6}$alkyl which is unsubstituted or substituted by OH, by $C_{1-6}$alkoxy, by $C_{1-6}$alkanoyloxy, or by $C_{1-6}$carbalkoxy, or $R_3$ is $C_{1-6}$alkyl which is unsubstituted or substituted by hydroxy, by $C_{1-6}$alkoxy, by $C_{1-6}$alkanoyloxy, or by $C_{1-6}$carbalkoxy having an additional free valence; and when L is $-{\oplus}N(R_2)(R_3)-$, a counterion $X^{\ominus}$ is present;

or said R' is interrupted or has a portion thereof replaced by an ionic bridge pair group $-Q^{\oplus}{\ominus}T-$ or $-T^{\ominus}{\oplus}Q$ ${\oplus}Q-$ wherein $T^{\ominus}$ is an anionic group selected from carboxy, sulfoxy, sulfato, phosphono, and phenolic hydroxy, and $Q^{\oplus}$ is a cationic group selected from quaternary ammonium, or when n is 3 and p is 1, R' is a tetravalent organic linking group covalently bonded to three $R_f$ groups and to Z and is selected from the group consisting of

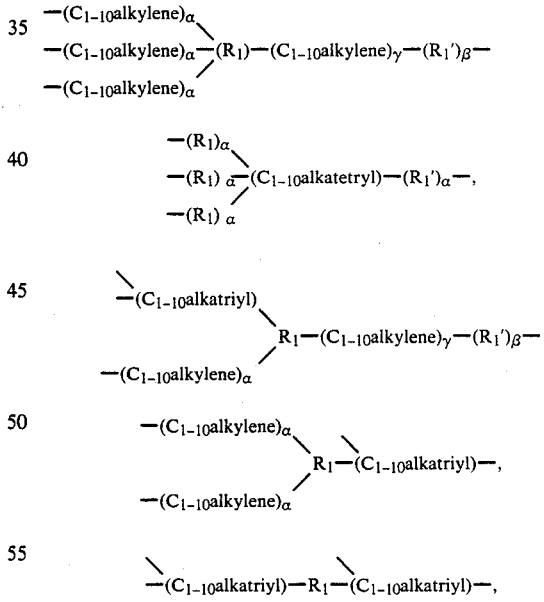

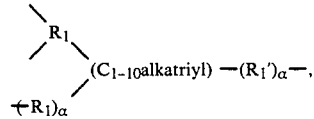

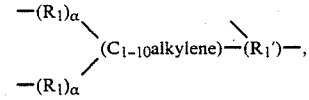

-continued $$\diagdown(R_1)-(C_{1-10}alkylene)-(R_1')-\diagdown$$

$$-(R_1)_\alpha\diagdown phentetryl-(R_1')_\alpha-, \quad \diagup(R_1) phentriyl-(R_1')_\alpha-,$$
$$-(R_1)_\alpha\diagup \qquad\qquad -(R_1)_\alpha$$

$$-(R_1)_\alpha\diagdown phentriyl-(R_1')-, \quad -(R_1)-phenylene-(R_1')-\diagdown,$$
$$-(R_1)_\alpha\diagup$$

$$-R_1-phenylene\diagdown$$
$$(+R_1-phenylene)_\alpha-(R_1')-, \quad \diagup R_1-phenylene-(R_1')-,$$
$$(+R_1-phenylene)_\alpha \qquad\qquad -R_1-phenylene\diagup$$

in each case being bound to Z through the bond shown on the right side of the above formulae, wherein each α, β, and γ is 0 or 1, but when β is 1, γ is 1, and α is 0; wherein each R' $C_{1-10}$alkylene, R' $C_{1-10}$alkatriyl, R' $C_{1-10}$alkatetryl, R' phenylene, R' phentrityl, and R' phentetryl is independently unsubstituted or substituted by hydroxy, halo, nitro, carboxy, $C_{1-6}$alkoxy, amino, $C_{1-6}$alkanoyl, $C_{1-6}$carbalkoxy, $C_{1-6}$alkanoyloxy, or $C_{1-6}$alkanoylamino;

each $R_1$ and $R_1'$ being independently selected from —L—, —L—CO—, —C(O)L—, —LCOO—, —OOCL—, —LSO$_2$—, —SO$_2$—L—, —LC(O)L—, —OP(O)(OR$_2$)—, —P(O)(OR$_2$)O—, —P(O)(OR$_2$)—, —CO—, —S—, —SO—, —SO$_2$—, —COO—, —OOC—, —OSO$_2$—, —OSO$_2$O—, —OC(O)O—, and —O—;

in which each L is independently —NR$_2$— or N$^+$R$_2$R$_3$—;

each $R_2$ being independently selected from
(a) a free valence,
(b) H, and
(c) $C_{1-6}$alkyl which is unsubstituted or substituted by $C_{1-6}$alkoxy, by halo, by hydroxy, by carboxy, by $C_{1-6}$carbalkoxy, by $C_{1-6}$alkanoyloxy, or by $C_{1-6}$alkanoylamino each of said $R_2$ unsubstituted and substituted $C_{1-6}$alkyl groups having 0-2 additional free valencies; and $R_3$ is (a) a free valence, (b) H, or (c) $C_{1-6}$alkyl which is unsubstituted or substituted by OH, by $C_{1-6}$alkoxy, by $C_{1-6}$alkanoyloxy, or by $C_{1-6}$alkoxy, by $C_{1-6}$alkanoyloxy, or by $C_{1-6}$carbalkoxy, each of said $R_3$ unsubstituted or substituted $C_{1-6}$alkyl groups having 0-2 additional free valencies; and when L is —$^+$NR$_2$R$_3$—, a counterion is present; or said R' is interrupted or has a portion thereof replaced by an ionic bridge pair group —Q$^\oplus\ominus$T or —T$^\ominus\oplus$Q— wherein T$^\ominus$ is an anionic group selected from carboxy, sulfoxy, sulfato, phosphono, and phenolic hydroxy, and Q$^\oplus$ is a cationic group selected from quaternary ammonium, and Z, when m is 1, is selected from the group consisting of
(a) $C_{6-24}$alkyl and $C_{6-24}$alkenyl, each of which are unsubstituted or substituted by Cl, Br, $C_{1-18}$alkoxy, nitro, alkanoyl of up to 18 carbon atoms, alkylmercapto of up to 18 carbon atoms, amino, $C_1$-$C_{18}$alkylamino, or di-$C_{1-18}$alkylamino;
(b) phenyl or naphthyl, each of which is unsubstituted or substituted by $C_{1-20}$alkyl, $C_{1-20}$alkoxy, alkanoyl of up to 20 carbon atoms, alkanoyloxy of up to 20 carbon atoms, mono- or dialkylamino of up to 20 carbon atoms;
(c) mono- or di-$C_{6-24}$alkylamino-$C_{2-7}$alkylene;
(d) alkoxyalkylene of 4–20 carbon atoms which is unsubstituted or substituted by one or two $C_{6-24}$carbalkoxy or $C_{6-24}$carbamoyl groups;
(e) poly$C_{6-24}$alkoxy-$C_{6-24}$alkyl or poly$C_{6-24}$alkoxy-$C_{6-24}$-alkenyl;
(f) a heterocyclic group selected from piperidino, piperazino, azepino, N-pyridium, morpholino, benztriazolyl, triazinyl, pyrrolidino, furanyl and tetrahydrofuranyl, each of which is unsubstituted or substituted by halo, $C_{1-18}$alkoxy, nitro, alkanoyl of up to 18 carbon atoms, $C_{1-18}$alkylmercapto, amino, or $C_{1-18}$alkylamino;
(g) poly-$C_{2-3}$alkoxy-phenyl, the phenyl group of which is unsubstituted or substituted by $C_{1-20}$alkyl;
(h) a group of the formula $$-X-[(CH_2)_4O]_gR''$$

or $$-X-(CH_2\underset{\underset{CH_3}{|}}{C}HO)_b(CH_2CH_2O)_c(CH_2\underset{\underset{CH_3}{|}}{C}HO)_dR''$$

or $$-X-(CH_2\underset{\underset{CH_3}{|}}{C}HO)_b(CH_2\underset{\underset{}{|}}{C}HO)_c(CH_2\underset{}{C}HO)_dR''$$

wherein X is oxygen or a bond when X is not bound to an oxygen atom, or X is a bond when it is bound to an oxygen atom, g is 2–80, b is 0–40, c is 0–80, and d is 0–40, while b+c+d is at least one; and R'' is H or $C_{1-4}$alkyl;
(i) a group of the formula $$A^\ominus \qquad\qquad CH_3$$
$$-\overset{\oplus}{N}-CH_2CH_2\underset{\underset{[(CH_2CHO)_e(CH_2CH_2O)_fH]_2}{|}}{N}[(CH_2\overset{|}{C}HO)_e(CH_2CH_2O)_fH]_2$$
$$\underset{CH_3}{|}$$

wherein each e is 3–20, and each f is 3–20 and A is an anion;
(j) a group of the formula $$(CH_2CH_2O)_{p'}-\underset{\underset{(CH_2CH_2O)_qH}{|}}{N}-R'''$$

wherein p' is 1–15, q is 1–15 and R''' is $C_{6-22}$ alkyl or $C_{6-22}$alkanoyl; and
(k) a group of the formulae

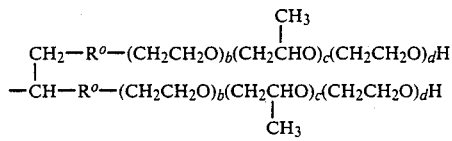

or

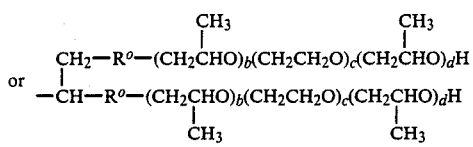

wherein b, c, and d are defined above and $R^o$ is alkylene, arylene, or arylene-alkylene, each having up to 18 carbon atoms and which is uninterrupted or interrupted by a hetero atom selected from —O—, —S—, or —NH—, Z, when m is 2, is a polyalkyleneoxy containing group, the terminal members of which are covalently bound to R' when p is 1 and to $R_f$ when p is zero; or Z is phenylene or naphthylene each of which is unsubstituted or substituted by $C_{1-20}$alkyl, by $C_{1-20}$alkoxy, by alkanoyloxy of up to 20 carbon atoms, by alkanoylamino of up to 20 carbon atoms, by halo, by amino, or by $C_{1-20}$alkylamino; or Z is an alkylene or alkenylene of up to 20 carbon atoms, each of which is unsubstituted or substituted by $C_{1-20}$alkoxy, by $C_{1-20}$alkylamino, by alkanoyl of up to 20 carbon atoms, by alkanoylamino of up to 20 carbon atoms, or by alkanoyloxy of up to 20 carbon atoms; or Z is N,N' piperazinylene or triazinylene, or Z, when m is up to 5000, is the backbone structure

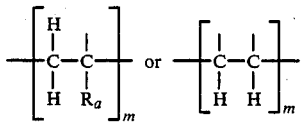

of a polymer or copolymer having a repeating unit of the formula

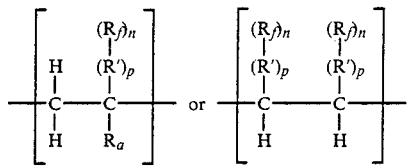

where R', $R_f$, n and p are defined above, and $R_a$ is H or lower alkyl, and extracting said oil from said deposit by a steam injection oil recovery process.

2. The method of claim 1 wherein said steam injection recovery process is a cyclic steam injection process.

3. The method of claim 1 wherein said steam injection recovery process is a steam drive process.

4. The method of claim 1 wherein said compound is contacted with said deposit simultaneously with steam.

5. The method of claim 1 wherein said compound is contacted with said deposit before said deposit is heated by said steam injection process.

6. The method of claim 1 wherein said compound is contacted with said deposit after said deposit is heated by said steam injection process.

7. The method of claim 1 wherein said deposit contains crude oil.

8. The method of claim 1 wherein said deposit contains a crude oil generating material selected from shale oil, tar sand, and bitumen.

9. The method of claim 8 wherein said deposit contains bitumen.

10. The method of claim 1 wherein each $R_f$ is the same.

11. The method of claim 1 wherein $R_f$ is perfluoroalkyl having 4–20 carbon atoms.

12. The method of claim 1 wherein $R_f$ is $C_6$–$C_{10}$ perfluoroalkyl.

13. The method of claim 1 wherein $R_f$ is $C_6$–$C_8$ perfluoroalkyl.

14. The method of claim 1 wherein $R_f$ is $C_6$ perfluoroalkyl.

15. The method of claim 1 wherein —R'—Z does not terminate in —OOC—Z.

16. The method of claim 1 wherein p is o.

17. The method of claim 1 wherein the portion of R' which binds to Z is other then B—OOC—, where B signifies the balance of R' exclusive of the —OOC— group.

* * * * *